United States Patent [19]

Dennis

[11] Patent Number: 4,663,627

[45] Date of Patent: May 5, 1987

[54] AIRCRAFT CONTROL POSITION INDICATOR

[75] Inventor: Dale V. Dennis, Williamsburg, Va.

[73] Assignee: The United States of America as represented by the Administrator of the National Aeronautics and Space Administration, Washington, D.C.

[21] Appl. No.: 578,387

[22] Filed: Feb. 8, 1984

[51] Int. Cl.⁴ .................... G01C 23/00; G01C 21/00
[52] U.S. Cl. ................... 340/975; 73/178 R; 244/1 R; 340/945; 340/971
[58] Field of Search ............... 340/945, 973, 975, 979, 340/966, 762, 766, 782, 815.03, 715, 971, 286 M, 525, 753, 754, 82, 984; 434/30, 45, 31, 37, 49, 51; 364/432–435; 73/178 R; 244/1 R; 362/62

[56] References Cited

U.S. PATENT DOCUMENTS

| | | | |
|---|---|---|---|
| 1,953,954 | 4/1934 | Constable | 434/30 |
| 3,354,554 | 11/1967 | Panerai et al. | 340/753 |
| 3,422,418 | 1/1969 | Simoneau . | |
| 3,474,438 | 10/1969 | Lauher . | |
| 3,497,870 | 2/1970 | Balding . | |
| 3,676,843 | 7/1972 | Schwartz . | |
| 3,737,846 | 6/1973 | Hernandez, Jr. . | |
| 3,970,829 | 7/1976 | Melvin . | |
| 4,034,334 | 7/1977 | Allyn . | |
| 4,115,754 | 9/1978 | Duzich | 340/971 |
| 4,210,908 | 7/1980 | Sakakibara . | |
| 4,219,821 | 8/1980 | Selim . | |
| 4,463,605 | 8/1984 | McDowell et al. | 434/31 |

OTHER PUBLICATIONS

E. S. Eccles, 'Solid State Light Emitting Displays', 8-77, pp. 4-5, Aviation Review.

Primary Examiner—James L. Rowland
Assistant Examiner—Brent A. Swarthout
Attorney, Agent, or Firm—Howard J. Osborn; William H. King; John R. Manning

[57] ABSTRACT

An aircraft control position indicator is provided that displays the degree of deflection of the primary flight control surfaces and the manner in which the aircraft will respond. The display includes a vertical elevator dot/bar graph meter display for indicating whether the aircraft will pitch up or down, a horizontal aileron dot/bar graph meter display for indicating whether the aircraft will roll to the left or the right, and a horizontal rudder dot/bar graph meter display for indicating whether the aircraft will turn left or right. The vertical and horizontal display or displays intersect to form an up-down-left-right type display. Internal electronic display driver means receive signals from transducers measuring the control surface deflections and determine the position of the meter indicators one each dot/bar graph meter display. The device allows readability at a glance, easy visual perception in sunlight or shade, near-zero lag in displaying flight control position, and is not affected by gravitational or centrifugal forces.

21 Claims, 3 Drawing Figures

AIRCRAFT CONTROL POSITION INDICATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates generally to aircraft flight instruments and in particular to aircraft control position indicators (ACPI). During stall/spin tests conducted at NASA Langley Research Center, it became apparent that the existing aircraft control position indicators (ACPI) were inadequate. Such stall/spin tests are conducted in order to determine the flight characteristics of aircraft in spins entered into after stalling has occurred. While in the spin, the aircraft descends rapidly with a helical motion about its spin axis. These tests subject the pilot and the aircraft flight instruments to strong centrifugal and gravitational forces. The effect on the pilot is to make head and eye positioning difficult. The effect on the flight control indicators is to cause drift and other inaccuracies. The pilot in a spin test needs an instantaneous display of the exact position of the control surfaces in order to follow a predetermined flight plan and prevent drifting of the controls from their desired position. The display must be visible under all cockpit conditions and can require only a minimum of mental effort for its interpretation.

The gyro horizon devices currently used in aircraft are unsuitable for spin/stall tests. They provide the pilot with only an indirect indication of the positions of the aileron, elevator, and rudder control surfaces. These devices depend on gyroscopes mounted within the aircraft and are attitude indicators, in that they display the orientation of the aircraft relative to the natural horizon. The gyroscopes are adversely affected by the centrifugal forces and there is some lag between the actual attitude of the aircraft and the attitude as shown on the display. This type of device therefore does not allow rapid and precise repositioning of the control surfaces according to a test flight plan.

Another flight instrument experimented with was a mechanical edge-type meter. These meters have a display that includes a scale and a moving needle. The position of the needle on the scale indicates the position of the control surface over its range. This device is unsuitable because the needle tends to bounce as the aircraft flies and is subject to overshoot when the aircraft changes attitude.

It is therefore an object of this invention to provide an aircraft control position indicator (ACPI) that communicates to the pilot the instantaneous position of the major control surfaces with no tendency toward overshoot.

It is also the object of this invention to present the control surface position information in a manner so as to minimize the mental effort required for the pilot to interpret the display during complicated and stressful maneuvers.

It is a further object of this invention to provide an aircraft control position indicator that is not affected by gravitational and centrifugal forces.

Another object of this invention is to provide a means for rapidly and precisely repositioning aircraft controls according to a predetermined flight plan.

Still another object of this invention is to provide an aircraft flight instrument display that is visible to the pilot under all cockpit lighting conditions.

Other objects will be apparent from the detailed description when read with reference to the accompanying drawings.

SUMMARY OF THE INVENTION

The above listed objects are attained through the practice of the present invention. The form of the ACPI aids the pilot in interpreting the information about the aircraft control surface positions and so minimizes the pilot's mental workload. In the embodiment showing the aileron, elevator, and rudder positions, the display of the ACPI actually approximates the shape of an aircraft. An upper horizontal dot/bar graph display of the ACPI is suggestive of the wings of an aircraft and represents the range of positions possible for the ailerons, which are located on the wing surface. If the display is actuated on the right-hand portion of the dot/bar graph display the aircraft will roll to the right and if the display is on the left portion, the aircraft will roll to the left. A lower horizontal dot/bar graph display of the ACPI suggests the rear portion of an aircraft and represents the range of possible deflections for the rudder, which is located at the rear of the aircraft. If the display is actuated on the right portion of this dot/bar graph display the aircraft will turn right, and if the display is actuated on the left portion, the aircraft will turn left. A vertical dot/bar graph display, which is effectively divided into an upper and a lower portion by the aileron dot/bar graph display, represents the range of possible positions for the elevators, which control the pitch of the aircraft. If the display is actuated on the upper portion of the dot/bar graph display the aircraft will pitch upward, and if the display is actuated on the lower portion, the aircraft will pitch downward.

The position of the display within the dot/bar graph display indicates the degree of deflection of the particular control surface associated with that display. The center of each display indicates the neutral, or undeflected position, and the ends of the displays indicate maximum deflections. The display may be actuated (for example, illuminated) at any position along the dot/bar graph display. The ACPI may consist solely of the aileron bar graph display and the elevator bar graph display. This ACPI is simpler to interpret because of the smaller amount of information conveyed. No one of the three dot/bar graph displays is essential to this invention. All subcombinations are envisioned to be within its scope.

The display significantly reduces the mental effort required for the pilot to interpret the display and reposition the control surfaces according to a predetermined flight plan. Because the device is totally electronic, it is not adversely affected by gravitational and centrifugal forces. The inputs to the device are voltage signals from transducers measuring the control surface deflections. These electrical signals produce no appreciable lag time, and so the display is almost instantaneous.

DETAILED DESCRIPTION OF THE INVENTION

Figure 1:
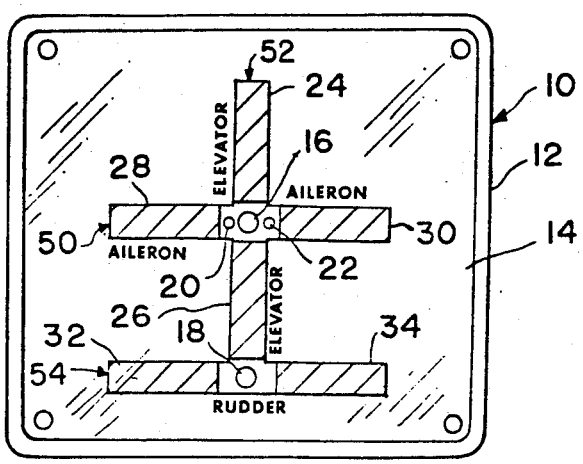
FIG. 1 is a front view of an embodiment of the aircraft control position indicator permitting position for the ailerons, elevators, and rudder.

An illustrative embodiment of the invention is shown in FIG. 1. This embodiment displays to the pilot the position of the ailerons, the elevators, and the rudder control surfaces. The reference numeral 10 designates the ACPI (Aircraft Control Position Indicator) in general. The ACPI 10 is contained within a rectangular instrument case 12. A rectangular plate 14 or dot/bar graph display is secured to the forward facing surface of the instrument case 12 and is cut to expose the display area (shown in cross hatch, with a vertical column being intersected by a pair of horizontal rows) formed by a plurality of dot/bar graph displays. In this embodiment, the display is a plurality of illuminating elements such as light emitting diodes (LEDs). The LEDs may be arranged in single rows and columns, in plural rows and columns or in any other combination or manner. Other suitable devices or illuminating elements may be employed, and the the only requirement is that some indication, by illumination or otherwise, be visible so as to disclose the amount of the deflection of the aircraft control surfaces.

In the illustrative embodiment of the FIG. 1, the ACPI 10 comprises a vertical column of illuminating elements or LEDs 52 intersected by two spaced apart horizontal rows of illuminating elements or LEDs 50 and 54. The illumination from the LEDs is visible through the portion of the rectangular plate 14 that is removed (this portion being shown in cross hatch outline of the FIG. 1).

The vertical column 52 of the display comprises, from top to bottom of the ACPI 10 of the FIG. 1, an upper bar of LEDs 24, a large lamp diode 16, a lower bar of LEDs 26, and a large lamp 18, The upper horizontal row 50 intersects the vertical column 52 at the lamp 16, which is between the upper bar of LEDs 24 and the lower bar of LEDs 26. More specifically, the upper horizontal row 50 includes, from left to right, an upper left bar of LEDs 28, a small lamp diode 20, the large lamp diode 16, a small lamp diode 22 and an upper right bar of LEDs 30. The second and lower horizontal row 54 forms an inverted "T". With the vertical column of LEDs 52 and comprises, from left to right, a lower left bar of LEDs 32, the large lamp diode 18, and a lower right bar of LEDs 34.

The vertical column of LEDs 52, excluding the lamp diode 18, represents the range of possible deflections for the aircraft elevators. When the lamp 16 at the center of the column 52 is activated, the elevators are in their neutral, or undeflected position. If a diode on the upper bar of diodes 24 is activated, the elevators are deflected upward into the stream of air flowing over the wing surface and the aircraft will pitch upward. An activated diode at the very top of the upper bar of LEDs 24 indicates that the elevators are deflected upward to the maximum extent possible. Similarly, an activated diode on the lower bar of diodes 26 indicates that the elevator surface of the aircraft is deflected downward, and that the aircraft will therefore pitch down. An activated diode at the lowest portion of the lower bar of diodes 26 indicates that the elevators have been deflected downward from the neutral to the maximum possible extent.

The upper horizontal row 50 formed by the light emitting diodes 28, 20, 16, 22 and 30 represent the range of possible deflections for the ailerons. The Lamp 16 has no function where the ailerons are concerned. The neutral position of the ailerons is instead indicated by the small lamp diodes 20 and 22, which may be lighted as a pair. A light on the upper left bar diodes 28 indicates that the left aileron is deflected upward and the right aileron is deflected downward, and that the aircraft will therefore roll to the left. A light on the upper right bar of diode 30 indicates that the left aileron has been deflected downward and the right aileron has been deflected upward producing a rolling moment of the aircraft to the right. A light at the extreme left or at the extreme right of the row indicates that the ailerons have been deflected, one up and one down, to the maximum possible extent.

The lower horizontal row 54 formed by the lower left bar of diodes 32, the lamp diode 18, and the lower right bar of diodes 34 represent the range of possible rudder deflections. If the lamp 18 is activated, the rudder is in the undeflected position. If a diode on the lower left bar of diodes 32 is activated, the rudder is deflected to the left and the aircraft will turn left. If a diode on the lower right bar of diodes 34 is activated, the rudder has been deflected to the right, thus, producing a right turn of the vehicle. A light at either the extreme left or extreme right of the lower horizontal row 54 indicates that the rudder has been deflected to the maximum allowable extent.

Figure 2:
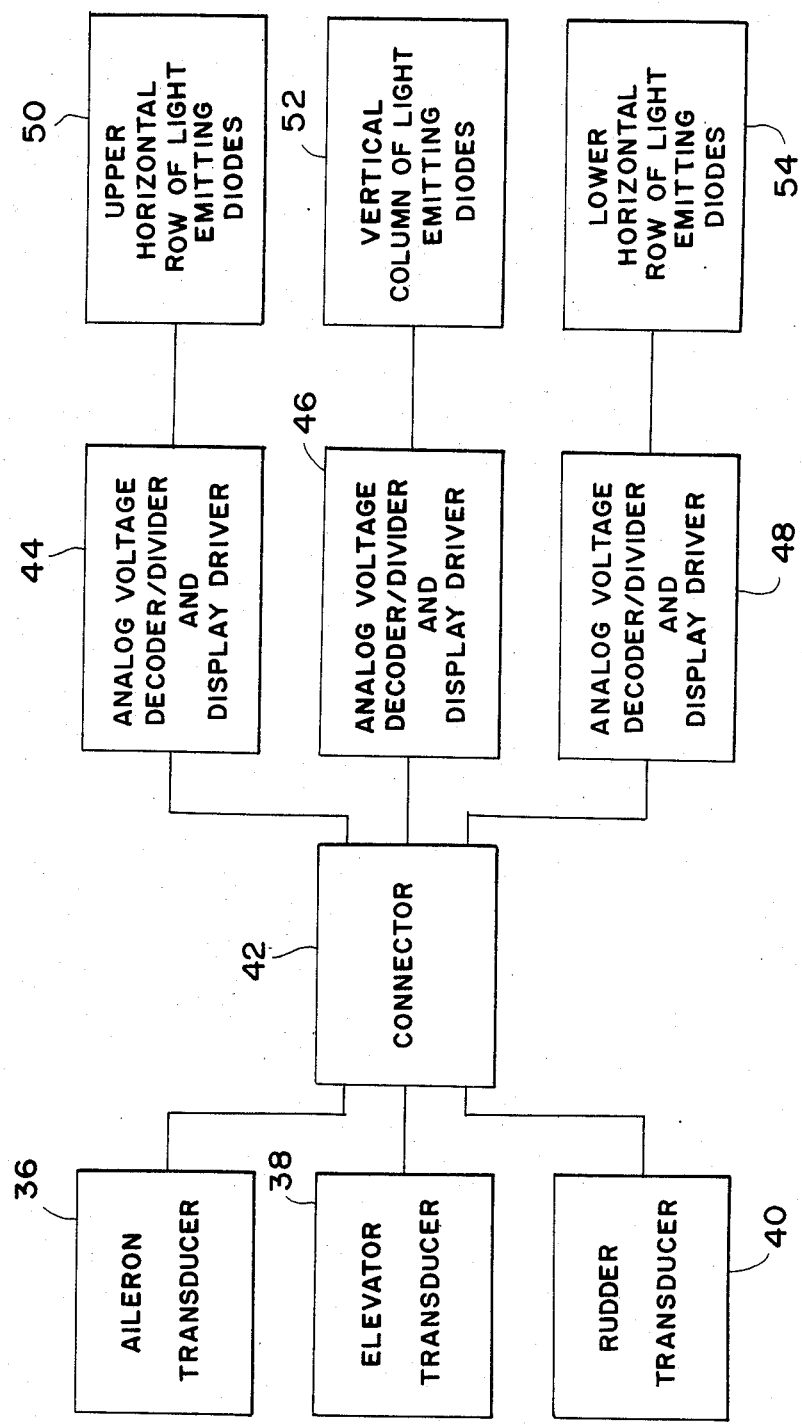
FIG. 2 is a block diagram partially showing the inputs to a system within the contemplation of the present invention, and specifically the ACPI of FIG. 1.

FIG. 2 is a block diagram showing the mode of operation of the embodiment of the invention shown in FIG. 1. Measurements are taken by an aileron transducer 36, an elevator transducer 38, and a rudder transducer 40 linked in a conventional manner to the aircraft control surfaces. These transducers produce analog voltage signals that are input to the ACPI 10 through a connector 42. Once inside the ACPI 10, the control surface signals are applied to a plurality of analog voltage decoder/divider and display drivers 44, 46, 48 which activate, respectively, diodes of the rows and column of light emitting diodes 50, 52, and 54.

Figure 3:
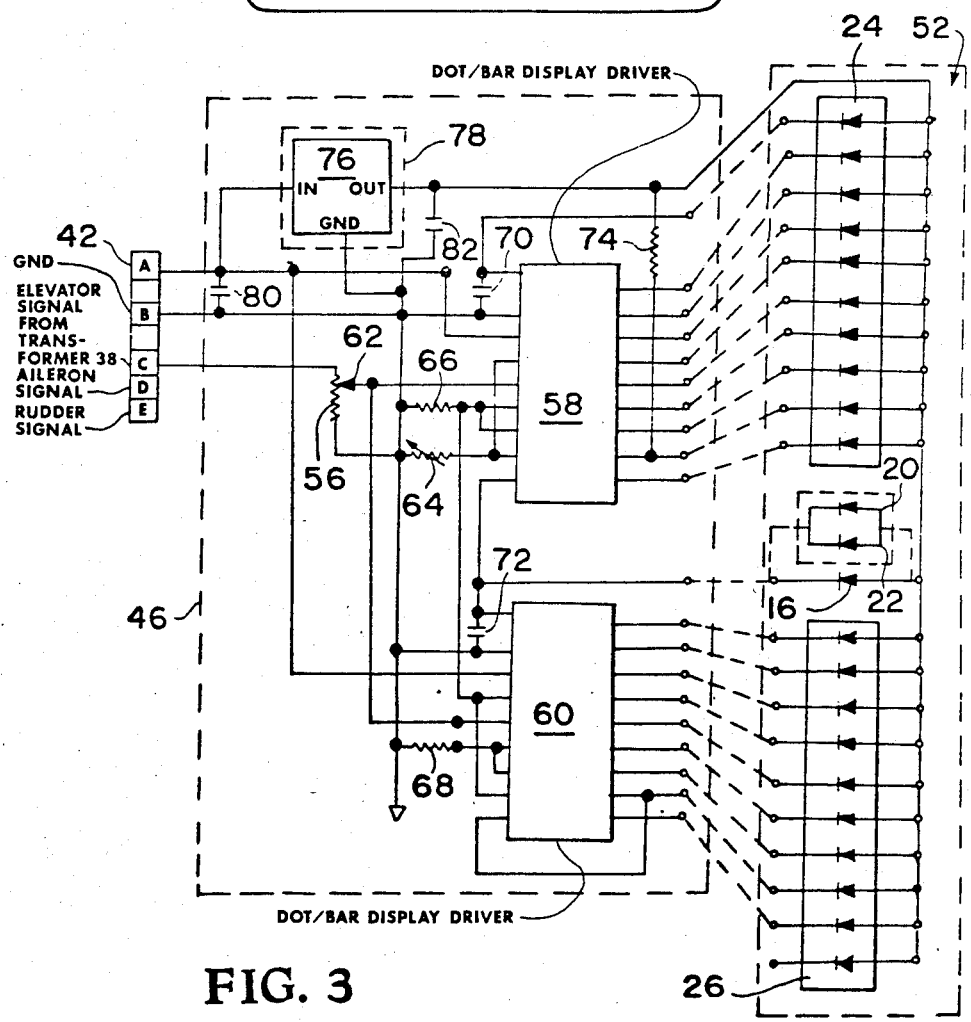
FIG. 3 is a partial electrical diagram of the ACPI showing an example of circuitry that may be used to process an input from, for example, the elevator while similar circuits may be used to process inputs from the aileron and rudder control surfaces.

A partial electric circuit diagram of the embodiment of the invention shown in FIG. 1 is shown in the FIG. 3. For illustration purposes, the circuitry is for processing the elevator signal, but substantially identical circuits can be used for processing the rudder and aileron portions of the display. The connector 42 provides the inlet for the elevator signal, as well as the rudder and aileron signals and the power and ground sources. A potentiometer 56 allows the display range of the analog voltage decoder/divider and display driver 46 formed by the combination of an integrated circuit 58 and an integrated circuit 60 to be adjusted to match the range of the input voltage. A wiper 62 of the potentiometer 56 carries the input signal to the integrated circuits 58 and 60. A variable resistor 64 allows the output of the voltage decoder/divider and display driver 46 to be adjusted so that a voltage at the center of the input range activates the lamp diode at the center of the column. The ACPI 10 is properly adjusted when full deflection of the control surface, in one direction through its respective transducer 38 of the FIG. 2, activates a diode(s) at one end of the display and full deflection of the control surface in the opposite direction, activates a diode(s) in the opposite end of the display.

A pair of resistors 66 and 68 control the current applied to the light emitting diodes and so the brightness of the display, and a pair of capacitors 70 and 72 are bypass capacitors to eliminate oscillation. A resistor 74 couples the integrated circuit 58 the to the integrated circuit 60. A voltage regulator 76 receives the power input from the connector 42 and generates an output voltage sent to one terminal of all the light emitting diodes. The heat generated by the voltage regulator 76 is dissipated by a heat sink 78. Reference numbers 80 and 82 denote the bypass capacitors for the voltage regulator 76. The ground signal generated by the analog voltage decoder/divider and display driver 46 at one of the outlet ports causes current to flow across the diode linked to that output and so activates one of the light emitting diodes.

FIG. 3 further shows two alternatives for the circuitry controlling the center of each row of light emitting diodes. A single lamp diode, such as the large lamp diode 16 of the FIG. 1, is used to indicate the center of the column of LEDs 52 for the elevator and the row of LEDs 54 for the rudder control surfaces. For the aileron row of LEDs 50, two lamp diodes, such as small lamp diodes 20 and 22 in FIG. 1, are placed in electrical parallel and so activated as a pair by a single ground signal from the voltage decoder/divider and display driver 46.

The integrated circuits 58 and 60 in FIG. 3 are each a dot/bar display driver that is commercially available. The integrated circuits are available from National Semiconductor Corporation as LM 3914 Dot/Bar Display Drivers. These drivers have two modes of operation: In a dot mode of operation only one of the LEDs is illuminated at any given time and in a bar mode of operation more than one of the LEDs can be illuminated at a time. Even though either mode of operation can be used with this invention the invention has been described as utilizing the dot mode of operation. In the dot mode of operation each integrated circuit includes two voltage dividers with each divider including ten resistors connected in series. Hence, each divider will divide the voltage applied to it into ten different voltage levels. The voltage from wiper 62 is applied to a first of the voltage dividers and a constant voltage from connection A of connector 42 is applied to the second voltage divider. The function of the second voltage divider is to produce a set of reference voltages. Ten "comparator" circuits are each connected to a corresponding resistor junction of the two voltage dividers to compare the voltages at the corresponding resistor junctions. Whenever, two corresponding junctions have the same voltage the corresponding "comparator" circuit conducts and gates the corresponding LED to ground thereby illuminating the LED. Integrated circuit 58 controls the ten LEDs in the upper bar of diodes 24 and integrated circuit 60 controls LED 22 and the first nine LEDs in lower bar of diodes 26.

OPERATION

Transducers of any type known in the art may be linked to each control surface to generate an analog voltage signal that corresponds to the deflection of the control surface over its range. The signal from transducer 38 representing the deflection of the elevator is applied through connection C of connector 42 to potentiometer 62. The resulting signal at the wiper 62 is applied to both of the integrator circuits 58 and 60 to illuminate one and only one of the LEDs in the column of LEDs 52. The position of the illuminated LED indicates the deflection of the elevator. The signal from transducer 40 representing the deflection of the rudder is applied through connection E of connector 42 to a second circuit like the one disclosed in FIG. 3 to illuminate a second LED in the row of LEDs 54. The position of the second illuminated LED indicates the deflection of the rudder. The signal from transducer 36 representing the deflection of the aileron is applied through connection D of connector 42 to a third circuit like the one disclosed in FIG. 3 to illuminate a third LED in the row of LEDs 50. The position of the illuminated LED indicates the deflection of the aileron. In this third circuit the two LEDs 20 and 22 are used in place of the single LED 16 to represent the neutral deflection of the aileron.

As is evident from the description in conjunction with the figures, the aircraft control position indicator of the present invention fills a flight research display that other flight instruments cannot satisfy. The test pilot controlling the aircraft in a spin has only to watch the position of a few lights on a simple display pattern to reposition the primary flight control surfaces according to a predetermined flight plan. The pilot is assured that the display is accurate because the electronic circuitry is not affected by the centrifugal and gravitational forces and because of the absence of lag time between the measurement transducer and the display.

The device further allows the pilot to check the primary control surfaces during flight to ensure they are responding properly to the cockpit controls. For instance, cable stretching causes the rudder to be only partially deflected when the cockpit rudder control may indicate maximum deflection. The value of the present invention is that it informs the pilot of the actual deflection of the control surface, not of the deflection that the controls are set to produce, and so provides a means of comparison between the two.

It is to be understood that the form of the invention herewith shown and described is to be taken as a preferred embodiment. Various changes may be made without departing from the invention. For example, circuitry other than that shown in FIG. 3 for performing the function of FIG. 3 could be used. That is, any circuitry that will select, in accordance with the amplitude of an electrical signal, a single light to be illuminated in a row of lights could be substituted for FIG. 3.

What is claimed is:

1. An aircraft control position indicator comprising:
   a first and second control surface transducer means for generator signals indicative of the degree of deflection of two respective control surfaces;
   a first display of illuminating elements and a first lamp means arranged within the first display;
   a second display of illuminating elements and a second lamp means arranged within the second display;
   said first and second displays arranged in transverse formation and crossing at said first and second lamp means;
   a first display driver means receiving a signal from said first control surface transducer means for activating said first display; and
   a second display driver means receiving a signal from said second control surface transducer means for activating the second display;

whereby a display pattern is generated by the first and second display that is insensitive to gravitational and centrifugal forces and that communicates to a pilot the degree of deflection of the respective control surfaces; and means coupled to said first and second lamp means to activate said first and second lamp means when said respective control surfaces are in a neutral position.

2. An aircraft control position indicator according to claim 1 wherein said first lamp means is a single lamp and said second lamp means is two lamps with each located on opposite sides of said single lamp.

3. An aircraft control position indicator according to claim 1 wherein said first and second displays are arranged such that they are perpendicular to each other.

4. An aircraft control position indicator according to claim 1 wherein:
the first control surface transducer means is coupled to the ailerons;
the second control surface transducer means is coupled to the elevators;
the first display forms a horizontal row; and
the second display forms a vertical column.

5. An aircraft control position indicator according to claim 1 including:
a third control surface transducer means for generating signals indicative of the degree of deflection of a third control surface;
a third display of illuminating elements and a third lamp means arranged within the third display;
said third display arranged with said first and second displays such that said third display forms an inverted T with said second display of illuminating elements; and
a third display driver means receiving the signals of said third control surface transducer means for activating said third display.

6. The aircraft control position indicator according to claim 1 wherein said first and second displays are arranged such that the second display forms an inverted T with said first display and intersecting at said second lamp means.

7. The aircraft control position indicator according to claim 5 wherein the first control surface transducer means is coupled to the ailerons;
the second control surface transducer means is coupled to the elevators;
the third control surface transducer means is coupled to the rudder;
the first display forms a horizontal row;
the second display forms a vertical column; and
the third display forms an inverted T with said second display.

8. The aircraft control position indicator of claim 1 wherein said control surface transducer means includes means for generating a signal to activate said first and second displays of illuminating elements in accordance with the degree of deflection of its respective control surface.

9. An aircraft control position indicator comprising:
a first and second control surface transducer means for generating signals indicative of the degree of deflection of first and second control surfaces, respectively;
a first display of illuminating elements;
a second display of illuminating elements;
said first and second display arranged in a transverse formation and intersecting between their end points;
a first display driver means receiving a signal from said first control surface transducer means for activating said first display; and
a second display driver means receiving a signal from said second control surface transducer means for activating the second display;
whereby a display pattern is generated by said first and second displays that is insensitive to gravitational and centrifugal forces and that communicates to a pilot the degree of deflection of the control surfaces;
the intersection between said first and second displays corresponding to a neutral degree of deflection of each of said first and second control surfaces.

10. An aircraft control position indicator according to claim 9 wherein said first and second displays are arranged such that they are perpendicular to each other.

11. An aircraft control position indicator according to claim 9 wherein:
the first control surface transducer means is coupled to the ailerons;
the second control surface transducer means is coupled to the elevators;
the first display forms a horizontal row; and
the second display forms a vertical column.

12. An aircraft control position indicator according to claim 9 including means forming a portion of said first and second displays and coupled to said transducer means for indicating the neutral position of its respective control surface.

13. An aircraft control position indicator according to claim 9 including:
a third control surface transducer means for generating signals indicative of the degree of deflection of the control surface;
said third display arranged with said first and second displays such that said third display forms an inverted T with said second display of illuminating elements; and
a third display driver means receiving the signals of said third control surface transducer means for activating said third display.

14. An aircraft control position indicator according to claim 13 including means forming a portion of said first, second and third displays and coupled to said transducer means for indicating the neutral position of its respective control surface.

15. The aircraft control position indicator according to claim 13 wherein the first control surface transducer means is coupled to the ailerons;
the second control surface transducer means is coupled to the elevators;
the third control surface transducer means is coupled to the rudder;
the first display forms a horizontal row;
the second display forms a vertical column; and
the third display forms an inverted T with said second display.

16. The aircraft control position indicator of claim 9 wherein said control surface transducer means includes means for generating a signal to activate said first and second displays of illuminating elements in accordance with the degree of deflection of its respective control surface.

17. An aircraft control surface position indicator comprising:

means for generating signals indicative of the position of two or more aircraft control surfaces;

a display of illuminating elements including a linear bar of said illuminating elements associated with each said control surface, each said bar having a lamp means for indicating the neutral position of the said control surface said lamp means differing in appearance from each said illuminating element, and associated with said bar disposed intermediately therein, said bar and said lamp means associated with each said control surface being driven by said circuit means to indicate the relative position of said associated aircraft control surfaces;

each said bar being intersected by a said bar associated with another said control surface at the intermediate portion thereof where a said lamp means is disposed to further indicate the neutral position of said control surface associated therewith; and circuit means coupled to said means for generating signals, said display and said lamp means for selectively driving portions of said display of illuminating elements or said lamp means depending upon the positions of the aircraft control surfaces to indicate the relative positions of each of said aircraft control surfaces.

18. The combination as defined in claim 17 wherein the aircraft control surface position indicator is capable of indicating the positions of the elevator, aileron and rudder control surfaces and said display includes three said bars of illuminating elements, said bars indicating the position of the elevator, aileron and rudder control surfaces, respectively.

19. The combination as defined in claim 18 wherein the bar indicating the position of the elevator and the bar indicating the position of the aileron intersect at substantially right angles and the bar indicating the rudder position forms an inverted T with one of said other bars of illuminating elements.

20. A method of indicating the position of the control surfaces of an aircraft comprising the steps of:

sensing the excursion of each of said control surfaces from a preselected position;

generating signals indicative of the amount of the excursion of each control surface from a preselected position;

applying the signals so generated to a plurality of groups of aligned illuminating devices, a group per control surface; and arranging the groups of aligned illuminating devices in relationship approximating the outline of an aircraft wherein the control surface associated with a group of illuminating devices is in spatial relationship to the position of the control surface on the aircraft, the neutral position of each said control surface being indicated by the intersection of its associated group of aligned illuminating devices with the group of aligned illuminating devices associated with another said control surface.

21. The method of claim 20 wherein the neutral position of each said control surface is further indicated by use of an illuminating device differing in appearance from the remaining said illuminating devices in said associated group of aligned illuminating devices.

* * * * *